(12) United States Patent
Park (10) Patent No.: US 6,755,319 B2
(45) Date of Patent: Jun. 29, 2004

(54) SEPARABLE HANDLE FOR PRESSURE POT (76) Inventor: Jong Peter Park, 1630 Summitridge Dr., Diamond Bar, CA (US) 91765

(*) Notice: Subject to any disclaimer, the term of this patent is extended or adjusted under 35 U.S.C. 154(b) by 28 days.

(21) Appl. No.: 10/252,162

(22) Filed: Sep. 23, 2002

(65) Prior Publication Data
US 2003/0229969 A1 Dec. 18, 2003

(30) Foreign Application Priority Data
Jun. 18, 2002 (KR) ................. 10-2002-0033911

(51) Int. Cl.⁷ ............................. B65D 25/10
(52) U.S. Cl. ............. 220/759; 16/425; 220/756
(58) Field of Search ............... 220/759, 756; 99/337, 403; 16/425; 294/34, 31.1

(56) References Cited

U.S. PATENT DOCUMENTS

| | | | |
|---|---|---|---|
| 2,501,940 A | | 3/1950 | Hibbard |
| 4,206,853 A | | 6/1980 | Iten et al. |
| 4,512,495 A | | 4/1985 | Bauer et al. |
| 5,317,959 A | | 6/1994 | Beluzzi |
| 5,509,173 A | * | 4/1996 | LaSaosa ............... 220/759 |
| 5,555,604 A | * | 9/1996 | Baumgarten ........... 220/759 |
| 5,638,984 A | | 6/1997 | Munari |
| 5,704,092 A | | 1/1998 | Nicollet et al. |
| 5,887,751 A | * | 3/1999 | Kroscher ............... 220/759 |
| 5,957,323 A | | 9/1999 | Terracciano |
| 6,250,493 B1 | | 6/2001 | Kwan |
| 6,439,420 B1 | | 8/2002 | Park |
| 6,439,421 B1 | | 8/2002 | Lin |
| 6,450,361 B1 | | 9/2002 | Mendelson et al. |

FOREIGN PATENT DOCUMENTS

| | | |
|---|---|---|
| JP | 2001-275858 | 9/2001 |
| KR | 20-0166096 B2 | 10/1999 |

* cited by examiner

Primary Examiner—Joseph Man-Fu Moy (57) ABSTRACT

Disclosed is a handle for a cooking utensil which is easily attachable to and detachable from a utensil body; and more particularly, a handle, which couples a utensil lid to the utensil body, to tightly seal and create pressure in the utensil body when cooking foodstuff. The handle for a utensil, attachable to and detachable from a utensil body having a coupling link, comprises a handle body, a handle body coupling means adapted to couple and decouple the handle body to and from the coupling link; a pressure piece adapted to press an outer edge of a cooking utensil lid to the cooking utensil body; and a pressure piece coupling means.

The handle body coupling means comprises a means for locking and a means for unlocking the handle body to and from the coupling link and a pressure piece connection means, wherein the pressure piece connection means comprises an open region having an inner area and an outer area formed on the pressure piece, the open region having a width greater in the inner area than in the outer area; and a rail having a projecting platform and a neck region formed on the handle body, the rail having a width greater in the projecting platform than in the neck region.

7 Claims, 6 Drawing Sheets

SECTON V-V

SECTON VIII-VIII

Fig. 9

Fig. 10

SEPARABLE HANDLE FOR PRESSURE POT

CROSS REFERENCE TO RELATED ART

This application claims the benefit of Korean Patent Application No. 10-2002-0033911 filed on Jun. 18, 2002, which is hereby incorporated by reference in its entirety.

BACKGROUND OF THE INVENTION

Description of the Related Art

The present invention relates to a handle for a cooking utensil which is easily attachable to and detachable from a cooking utensil body; and more particularly, a handle, which couples the utensil's lid to its body, to tightly seal and create pressure in the utensil body when cooking foodstuff.

Conventional cooking utensils, such as pots and pans, are well known and used in a kitchen. Although, some types of cooking utensils are frequently used, other types are not. Those types that are not used are stored for a period of time between uses. In addition, pots and pans require a substantially larger storage space in the kitchen than other cookware such as dishes or spatulas. Generally, pots and frying pans are made with handles that are securely and permanently fixed to the outer bodies by such methods as welding or screw joints. The conventional cooking utensils have handle(s) affixed to the body of the cooking utensil, which makes it unsuitable for cooking or storage in an oven and for placement on a table for serving. Pots and pans with detachable handles require less space, as the handles may be removed and placed inside the pots or pans, thereby enabling the pots and pans to be stored closer together.

A separable handle for a cooking utensil is taught in Korean Utility Laid-Open No. 20-0166096, published on Oct. 25, 1999. The operation of the separable handle disclosed in the publication is as follows. Affixed to the outer body is a 'ㄷ' shaped rectangular bracket with an opening in the middle. A handle with a 'u' shaped end slides over the bracket, and a switch releases a shaft that slides into the opening to secure the handle onto the utensil body.

A benefit of the above mentioned art is its simplicity; however, an inconvenience of such art is that if either the hook on the handle or the bracket on the utensil is bent, the handle can become unstable and can cause the body of the utensil to shake as it is being handled.

In such publications as above, the structure of the design is simple; however it is inconvenient. Moreover, it does not teach a separable handle capable of coupling the utensil's lid to its body, to tightly seal and create pressure in the utensil body.

OBJECTS OF THE INVNETION

An object of the present invention is to provide a separable handle capable of creating pressure in a cooking utensil which can be easily attached to and detached from a utensil body to reduce the amount of spatial volume a cooking utensil takes up when it is stored, so that the cooking utensil can be stored in a small area such as an oven or electric range.

Another object of the present invention is to provide a handle for cooking utensil which can turn a conventional cooking utensil into a pressure cooker when necessary by providing a pressure piece attached to the handle body which secures the utensil lid to the utensil body.

Yet another object of the present invention is to provide a separable handle capable of creating pressure in which the operations of creating pressure is relatively easy and convenient.

SUMMARY OF THE INVENTION

Accordingly, the present invention is directed to a cooking utensil handle structure that substantially obviates one or more of the problems, limitations, and disadvantages of the related art.

An object of the present invention is to provide a cooking utensil handle structure which can be easily attached to and detached from a utensil body to reduce the amount of spatial volume a cooking utensil takes up when it is stored.

Another object of the present invention is to provide a handle structure which can be used as a means for securing a utensil lid to a utensil body to create pressure, thereby accelerating the cooking time of foodstuff when the cooking utensil is heated.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention as embodied and broadly described herein, in a cooking utensil handle detachable and attachable to a cooking utensil body having a coupling link, the handle comprises a handle body, handle body coupling means adapted to couple and decouple the handle body to and from the coupling link; a pressure piece adapted to press an outer edge of a cooking utensil lid to the utensil body; and a pressure piece coupling means, wherein the pressure piece coupling means slidably engages the pressure piece to the handle body.

The handle body coupling means comprises a means for locking the handle body, to couple the handle body to the coupling link; and a means for unlocking the handle body, to decouple the handle body from the coupling link. The means for locking the handle body comprises a plunger having a slant head and a plunger spring constantly pushing the plunger so that the slant head protrudes inside a coupling recess. When the handle is being coupled with the body, the slant head of the plunger is pushed back by an entering force of the coupling link inserted into the coupling recess, and then the plunger enters an opening provided on the coupling link when the coupling link is completely inserted into the coupling recess. The plunger inserted in the coupling link prevents the handle from separating from the utensil body.

The means for unlocking the handle body comprises a plunger pin inserted into a pin hole provided on the side of the body of the plunger and a push button having a slant end. The slant head of the plunger is pushed out of the coupling link by an entering force of the slant end of push button pushing the plunger pin downwards to decouple the handle body from the coupling link of the utensil body.

The pressure piece coupling means comprises an open region having an inner area and an outer area formed on the pressure piece, and a rail having a projecting platform and a neck region formed on the handle body. The open region of the pressure piece has a width greater in the inner area than in the outer area; and the rail of the handle body has a width greater in the projecting platform than in the neck region. Thus, the open region of the pressure piece slidably engages the rail of the handle body.

The pressure piece coupling means further comprises a first spring accommodating means formed on the open region of the pressure piece; a second spring accommodating means formed on the rail of the handle body; a seal spring having a front and back end; and to accommodate the spring connected on opposite ends, a spring path formed on the handle body. The seal spring is connected at the front end to the first spring accommodating means and the back end to the second spring accommodating means. The tension of the seal spring constantly pulls the pressure piece towards a first position where the pressure piece presses the outer edge of the cooking utensil lid to couple the utensil lid to the utensil body.

Preferably, the pressure piece coupling means comprises a pressure piece locking means. The pressure piece locking means locks the pressure piece in a second position where the pressure piece does not press the outer edge of the cooking utensil lid. The pressure piece locking means comprises a key installed on the pressure piece, and a pressure button having a projecting end installed on the handle body. At the second position, the pressure button engages the key to prevent the pressure piece from moving towards a pressure creating first position. The pressure piece locking means further comprises pressure button springs constantly pushing the pressure button outwards from the handle body. However, an entering force substantially greater than the strength of the tension of the pressure button springs pushing the pressure button shits the pressure piece out of the second position towards the first position. Both the projecting end of the pressure button and the key has a slant head. The slant head of projecting end of the push button allows a pressure piece pushing force to slide the pressure piece into the second position. The slant head of the key allows the pressure piece to slide out of the second position towards the first position.

It is to be understood that both the foregoing general description and the following detailed description of the present invention are exemplary and explanatory and are intended to provide further explanation of the invention as claimed.

DETAILED DESCRIPTION OF THE PREFERRED EMBODIMENTS

Reference will now be made in detail to the preferred embodiments of the present invention, examples of which are illustrated in the accompanying drawings.

A handle for a cooking utensil according to the preferred embodiments of the present invention as shown in FIG. 1 to FIG. 5 comprises a handle body (10) and a pressure piece (30). For the handle body to engage and disengage from the utensil body, a coupling link (3) is formed on the outer circumference of the utensil body. The handle further comprises a handle body coupling means which couples and decouples the handle body to and from the coupling link, and a pressure piece connection means which slidably engages the pressure piece (30) onto to the handle body (10).

Figure 1:
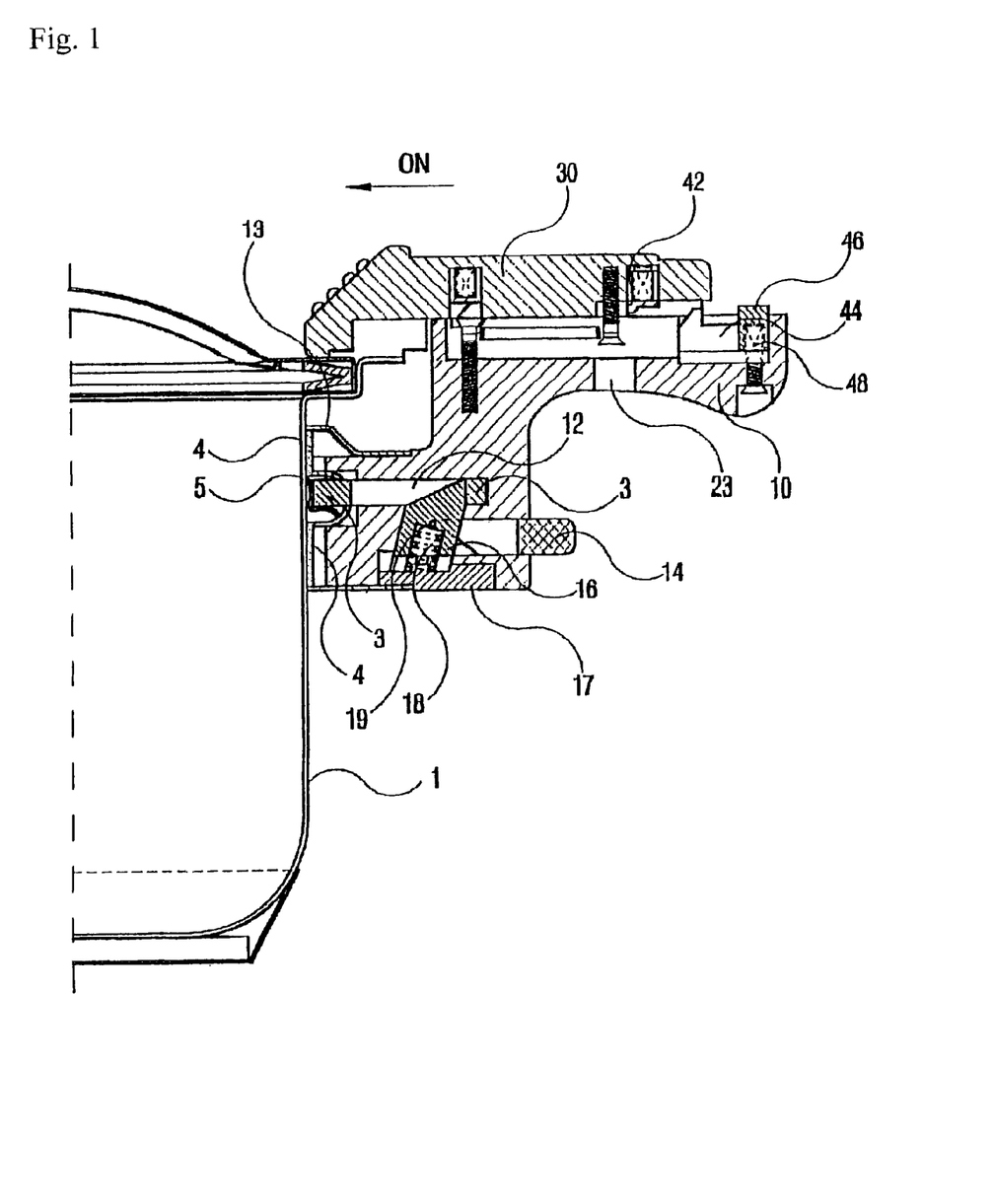
FIG. 1 illustrates a cross-sectional view of a handle according to the preferred embodiment of the present invention, in which the handle is in a position to create pressure by coupling a utensil lid to a utensil body.
Figure 2:
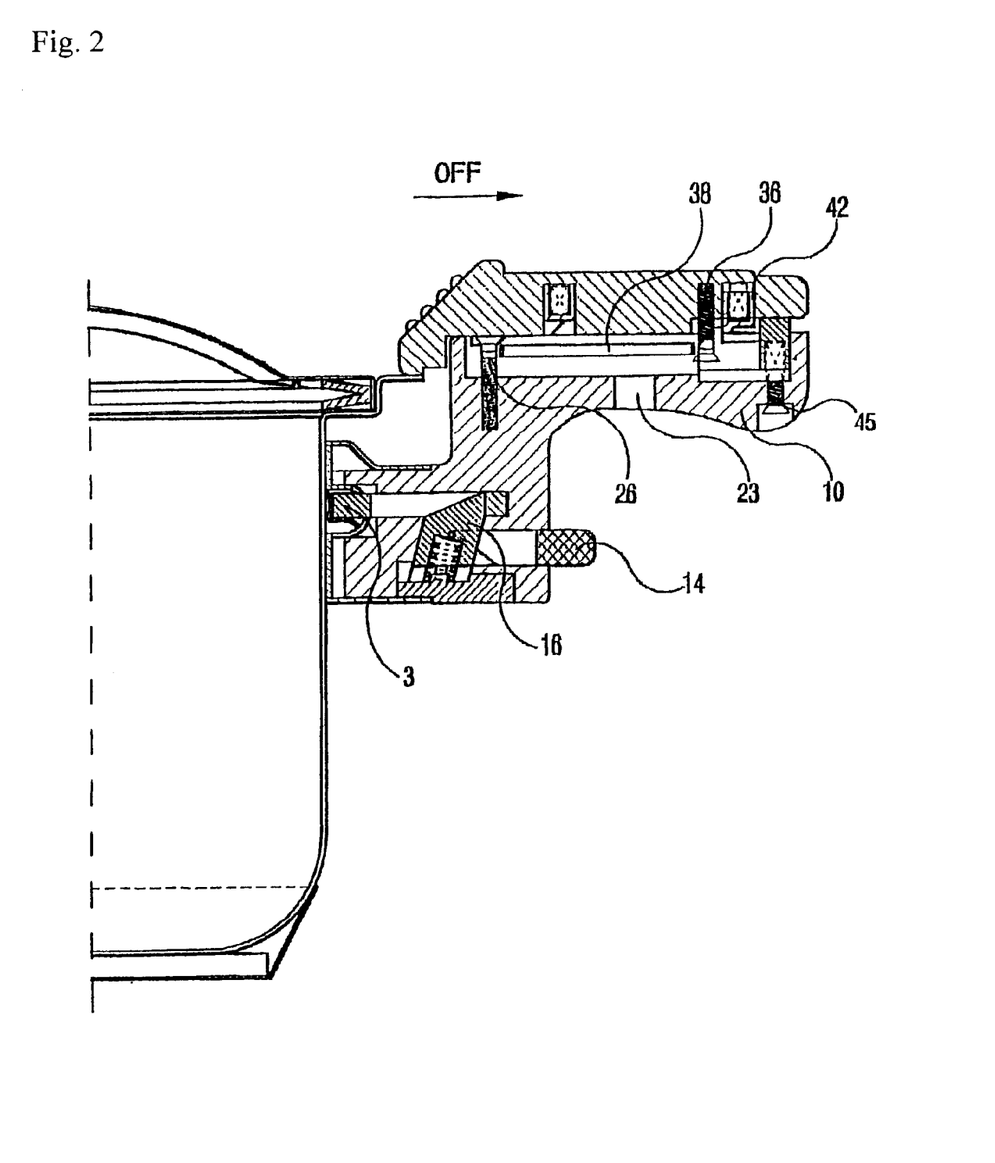
FIG. 2 illustrates a cross-sectional view of the handle, in which the handle is not in position create pressure.

To disengage and engage with the handle body (10), the coupling link (3) is attached at a lateral side on the outer circumference of the cooking utensil (1). Preferably, the coupling link is connected in attached to the cooking utensil so as to be folded and unfolded between a first position parallel with the utensil body and a second position perpendicular to the utensil body. In the first position, the coupling link protrudes out of the lateral side of the cooking utensil to engage the handle body. When disengaged from the handle body, the coupling link can be folded to the second position with a rotational movement up or down to reduce the spatial volume of the utensil body (1). This allows the utensil to be stored in a space with limited volume such as an oven, range or storage cabinet.

In the preferred embodiment, the coupling link (3) is coupled with the utensil body by a casing welded to the utensil body. The casing comprises a spring case (4) and a spring plate (5) and allows the coupling link to hold 90 degree position perpendicular with the utensil body. Moreover, the coupling link (3), supported by the spring plate (5), allows the handle to be securely coupled with the utensil body.

The handle body (10) attaches to the coupling link of the utensil body (1) and comprises a handle body coupling means. The handle body coupling means comprises a means for locking the handle body, to couple the handle body to the coupling link; and a means for unlocking the handle body, to decouple the handle body from the coupling link. For the handle body (10) to provide the means for locking and unlocking the handle body to and from the coupling link, the handle body has an inner space formed in the interior of the handle body. In the area where the coupling link (3) meets the handle body (10) a coupling recess (12) is also formed on the handle body. Projecting out of the opposite end of the coupling recess is a push button (14) which operates to disengage the handle body from the coupling link attached to the utensil body (1). To support the push button (14), the handle body coupling means further comprises a bottom plate (17).

The means for locking the handle body (10) comprises a plunger (16) having a slant head and a plunger spring (18). Preferably, the bottom side of the plunger (16) has an aperture to accommodate the plunger spring (18). The plunger spring, inserted into the aperture of the plunger and supported by the bottom plate, constantly pushes the plunger head into the coupling recess (12) of the handle body. The head of the plunger that is slanted is also positioned to face the coupling link (3) entering the coupling recess. This allows an entering force of the coupling link (3) to push back the slant head of the plunger. After the slant head of the plunger is push back, the tension of the plunger spring (18) pushes the plunger head back into the coupling recess (12); however, this time through an opening provided on the coupling link (3). The flat side or the side opposite the slant head of the plunger (16) prevents the coupling link from retreating out of the coupling recess (12).

The unlocking means of the handle body includes a pin (19), a pin hole to accommodate the pin (19) provided on the body of the plunger (16) just above the aperture provided on the plunger to accommodate the plunger spring (18), and a push button (14). Preferably, the push button (14) is coupled to the handle body in push button accommodating recess formed provided on the handle body on the opposite end where the coupling link (3) is inserted. The push button also has a 'ㄷ' shape and slant end.

When the push button is pushed, the slant end of the push button in turn pushes the pin (19) down. The downward motion of the pin inserted into the side of the plunger pulls the head of the plunger (16) out of coupling recess. The coupling link (3) can then be disengaged from the handle body. To make the downward motion possible, the slant end of the push button faces the bottom of the handle body. By constantly pushing the plunger (16) with the pin upwards, the tension of the plunger spring (18) pushes the tail end of the push button (14) out from the handle body (2) to its starting position.

Figure 3:
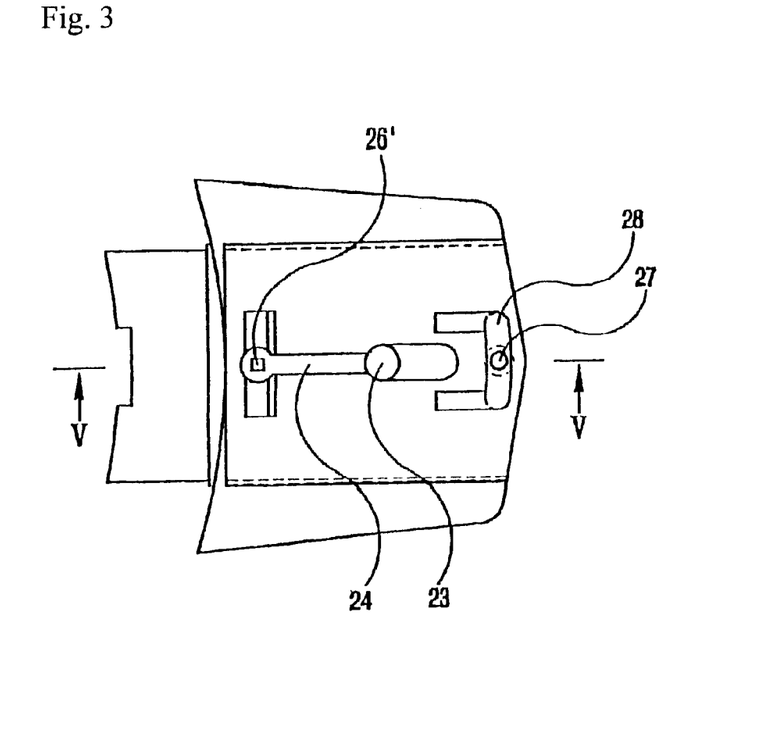
FIG. 3 illustrates a top plan view of a handle body according to the preferred embodiment of the present invention.

The following parts are seen in FIG. 3: 23 is attachment hole, 24 is a first seal spring accommodating recess, 26' is a first screw recess (26), 27 is a pressure button screw accommodating recess, 28 is a pressure button accommodating recess.

Figure 4:
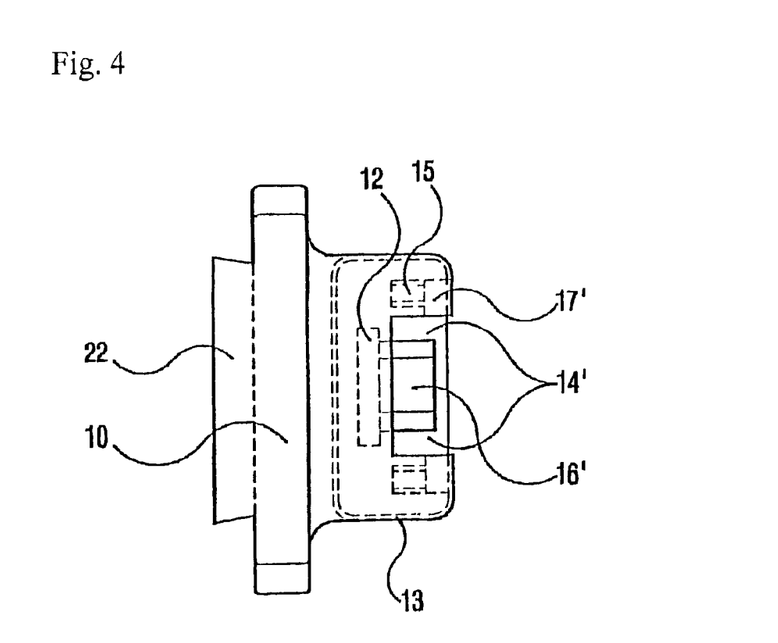
FIG. 4 illustrates a side view of the handle body.
Figure 5:
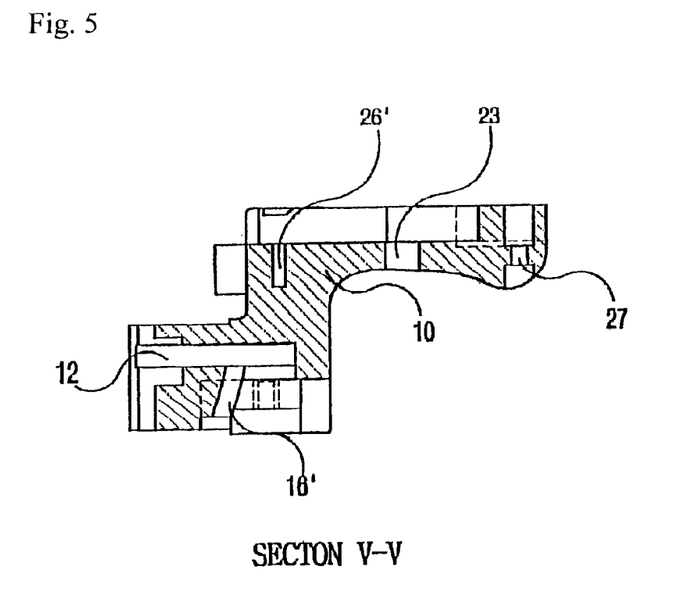
FIG. 5 illustrates a cross-sectional view of the handle body as shown in FIG. 3 along section V—V.

The following parts are seen in FIG. 4: 12 is the coupling recess, 13 is a handle body reinforcement metal, 15 is a bottom plate (17) screw accommodating nut, 14' is the push button (14) accommodating recess, 16' is a plunger (16) accommodating recess, 17' is a bottom plate (17) accommodating recess. Also, on the upper region of the handle body is a rail (22) to slidably engage the pressure piece onto the handle body. Besides the rail the, the pressure piece connection means comprises an open region (34) provided on the pressure piece. The pressure piece also has a pressure piece head (32) to press an outer edge of the utensil lid.

Figure 6:
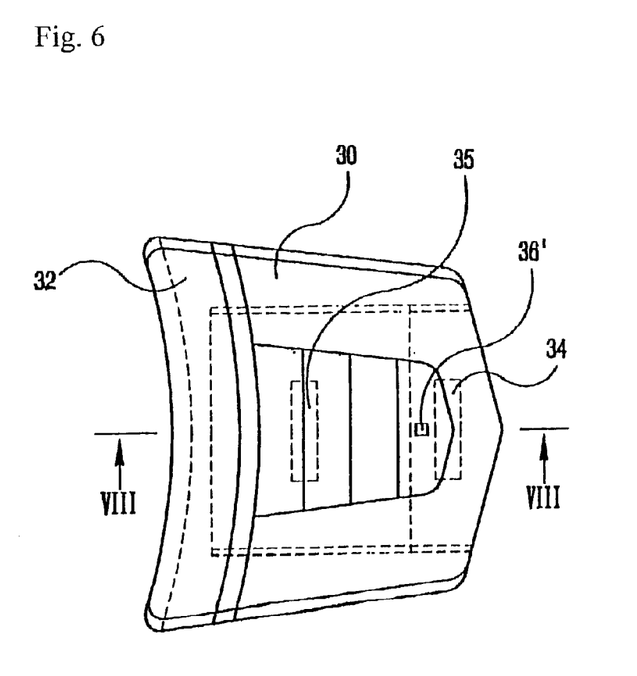
FIG. 6 illustrates a top plan view of a pressure piece according to the preferred embodiment of the present invention.
Figure 7:
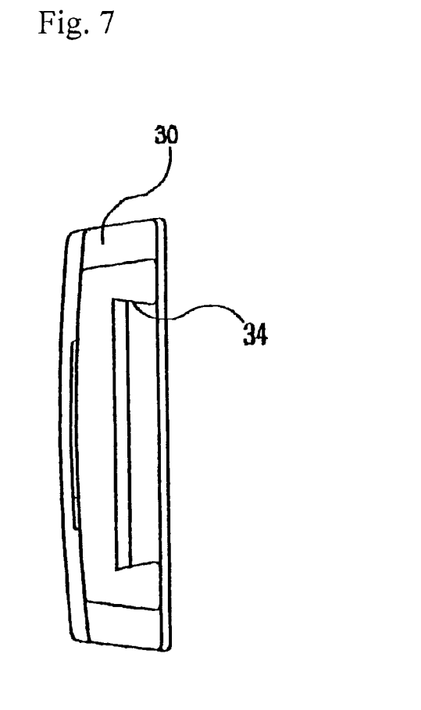
FIG. 7 illustrates a side view of the pressure piece.
Figure 8:
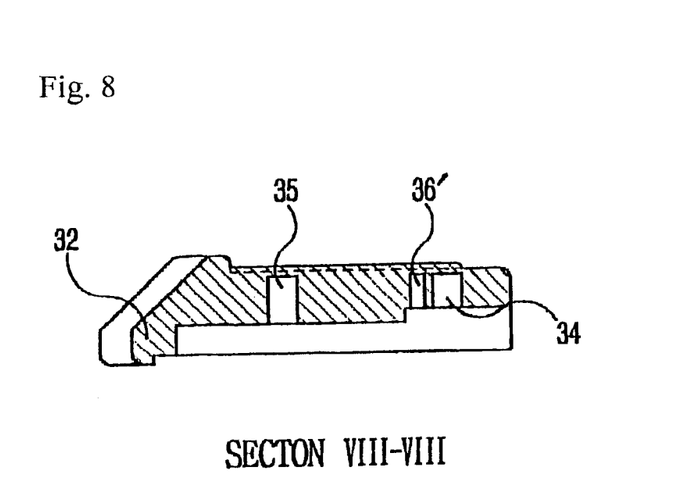
FIG. 8 illustrates a cross-sectional view of the pressure piece as shown in FIG. 6 along section VIII—VIII.

The pressure piece coupling means comprises an open region (34) having an inner area and an outer area provided on the inner region of the pressure piece, and the rail (22) having a neck region and a projecting platform. The open region (34) of the pressure piece has a width greater in the inner area than in the outer area; and the rail (22) has a width greater in the projecting platform than in the neck region. The varying widths of the rail and the open region ensure that the pressure piece can slide along the rail and, at the same time, be secured to the rail. Preferably, the open region of the pressure piece is deeper at the tail end of the pressure piece. This deeper area is formed to accommodate a pressure a key that engages a pressure button of the handle body. The operations of the key and the pressure button will be described in detail below.

The pressure piece coupling means further comprises a first spring accommodating means (26) and its corresponding first screw recess (26') formed on the open region of the pressure piece, and a second spring accommodating means (36) and its corresponding second screw recess (36') formed on the rail of the handle body. The seal spring (38) having a front and back end is connected at the front end to a screw attached to the first screw recess (26') and the back end is connected to a screw attached to second screw recess (36'). To accommodate the spring connected to screws on opposite ends, a spring path (24) is formed on the handle body. The spring can be connected to the two ends by first attaching one end of the seal spring to the screw on the handle body and then secondly by attaching the other end of the seal spring to a second screw by screwing the second screw through the attachment hole (23) provided on the handle body to the first screw recess of the pressure piece. The tension of the seal spring (38) constantly pulls the pressure piece (30) towards a first position where the pressure piece (30) presses an outer edge of the cooking utensil lid to couple the utensil lid to the utensil body.

Preferably, the pressure piece coupling means comprises a pressure piece locking means. The pressure piece locking means locks the pressure piece (30) in a second position where the pressure piece does not press the outer edge of the cooking utensil lid. More preferably, the pressure piece locking means comprises a key (42) installed on the pressure piece and a pressure button (46) having a projecting end (44) installed on the handle body. At the second position or unlocked position, the projecting end (44) of the pressure button engages the key (42) to prevent the pressure piece from retreating to the first position. The pressure piece locking means further comprises pressure button springs (48) constantly pushing the pressure button (46) and the projecting end (44) outwards from the handle body so as to engage the key (42). However, an entering force substantially greater than the strength of the tension of the pressure button spring pushing the pressure piece shits the pressure piece out of the second position towards the first position. Preferably, both the projecting end (44) of the pressure button (46) and the key (42) have slant heads. The slant head of projecting end allows a pressure piece pushing force to slide the pressure piece into the second position. The slant head of the key (42) allows the entering force pushing the pressure piece to overcome the strength of the pressure button springs (48) pushing the pressure button and slide out of the second position past the projecting end (44) towards the first position.

Figure 9:
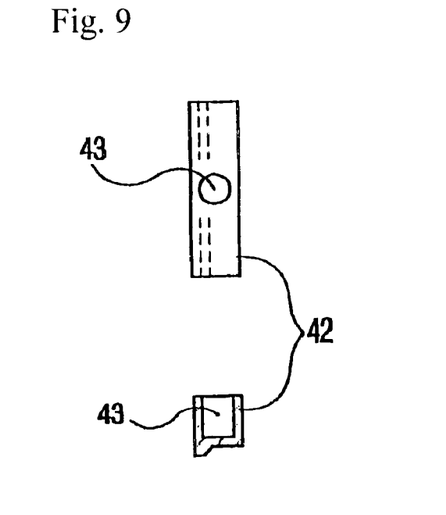
FIG. 9 illustrates a top view (FIG. 9-1) and a cross-sectional view (FIG. 9-2) of a key according to the preferred embodiment of the present invention.

FIG. 9 illustrates a top view (FIG. 9-1) and a cross-sectional view (FIG. 9-2) of the key (42) according to the preferred embodiment of the present invention. An aperture to accommodate a key spring is provided on the center of the key.

Figure 10:
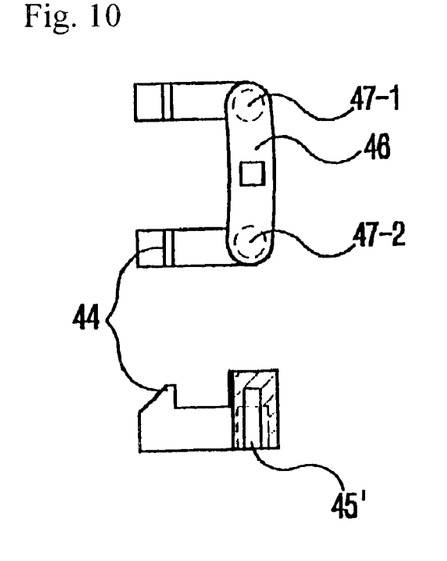
FIG. 10 illustrates a top view (FIG. 10-1) and cross-sectional view (FIG. 10-2) of a pressure button according to the preferred embodiment of the present invention.

FIG. 10 illustrates a top view (FIG. 10-1) and cross-sectional view (FIG. 10-2) of the pressure button (46) according to the preferred embodiment of the present invention. A screw accommodating hole is provided on the center of the pressure button. Also provided on the pressure button are two recesses to accommodate the pressure button springs.

Preferably, the key (42) of the pressure button locking means as shown in FIG. 9 is installed on the pressure piece; however it can optionally be molded on the pressure piece as a protrusion. As shown, the key is inserted into a key recess (34) provided on the pressure piece. A key spring is inserted into the aperture (43) of the key so that the key is constantly pushed outwards from the pressure piece towards the rail of the handle body to engage the projecting end (44) of the pressure button.

The pressure button (46) as shown in FIG. 10 comprises a projecting end (44) which engages the key (42) and two recesses (47-1, 47-2) to accommodate the pressure button spring. Inserted on the two recesses are two coil spring (coil spring: not pictured) so that the pressure button protrudes out of the handle body. The pressure button is coupled with the handle body by a screw (45) going through a screw accommodating hole (45') and screwing into a pressure button screw accommodating recess (45") provided on the handle body. Although the key (42) can get passed the projecting end of the pressure button, the end opposite the projecting end of the pressure button ensures that the pressure piece does not slide past the pressure button and detach from the handle body.

The structure above can be seen and summarized in the following description of operations.

The handle body is coupled to the utensil body when the coupling link (3) is inserted into the coupling recess (12) and the head of the plunger (17) enters an opening provided on the coupling link. When the handle is attached to the handle body and a lid is placed on the utensil body, the pressure piece can be pushed to press an outer edge of the utensil lid. When the pressure piece is pushed and the key passes over the projecting end (44) of the pressure button, the seal spring (38) pulls the pressure piece towards a pressure creating first position where the head of the pressure piece presses an outer edge of the utensil lid. When the lid is coupled to the utensil body, the utensil can be used as a pressure cooker.

Installed on the utensil lid is a safety relief valve which automatically relieves pressure when the inner pressure exceeds the predetermined operating pressure. Also installed is a manual pressure relief valve to relieve the inner pressure manually before opening the utensil lid. When the pressure cooking is done and after the manual pressure relief valve is opened, the pressure piece can be pushed back from the first position to the second position by pushing the pressure piece outwards until the key engages the projecting end (44) of the pressure button. When the key and the projecting end of the pressure button are engaged, the seal spring (38), which constantly pulls the pressure piece towards the first position, cannot pull the pressure piece towards the pressure creating first position.

The handle can then be detached from the coupling link by pushing the push button (14) installed on the handle body. The push button pushes the pin (19) inserted on the body of the plunger (16) downwards. After the push button pushes the plunger head out of the coupling recess, the handle body can be detached from the coupling link.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed:

1. In a cooking utensil handle detachable and attachable to a cooking utensil body having a coupling link, the handle comprising
    a handle body;
    a handle body coupling means adapted to couple and decouple the handle body to and from the coupling link;
    a pressure piece adapted to press an outer edge of a cooking utensil lid to the cooking utensil body; and
    a pressure piece coupling means,
wherein said pressure piece coupling means slidably engages the pressure piece to the handle body.

2. The handle of claim 1 wherein said handle body coupling means comprises
    a means for locking, said means for locking comprising
        a plunger having a slant head and
        a plunger spring constantly pushing the plunger so that the slant head protrudes inside a coupling recess,
    wherein the slant head of the plunger is pushed back by an entering force of the coupling link inserted into the coupling recess and then enters a hole of the coupling link when the coupling link is completely inserted so as to prevent the coupling link from retreating; and a means for unlocking, said means for unlocking comprising
        a plunger pin inserted into a pin hole provided on the body of the plunger and
        a push button having a slant end,
    wherein the slant head of the plunger protrudes outside the coupling recess by an entering force of the push button pushing the plunger pin downwards so as to unlock the handle body from the coupling link.

3. The handle of claim 1 wherein said pressure piece coupling means comprises
    an open region having an inner area and an outer area formed on the pressure piece, said open region having a width greater in the inner area than in the outer area; and
    a rail having a projecting platform and a neck region formed on the handle body, said rail having a width greater in the projecting platform than in the neck region, wherein the open region of the pressure piece slidably engages the rail of the handle body.

4. The handle of claim 3 wherein said pressure piece coupling means further comprises
    a first spring accommodating means provided on the open region of the pressure piece;
    a second spring accommodating means provided on the rail of the handle body;
    a spring path provided in between the first spring accommodating means and the second spring accommodating means; and
    a seal spring having a front and back end, said seal spring connected at the front end to the first spring accommodating means and the back end to the second spring accommodating means,
    wherein the tension of the seal spring constantly pulls the pressure piece towards a pressure creating first position where the pressure piece presses the outer edge of the utensil lid.

5. The handle of claim 4 wherein said pressure piece coupling means additionally comprises
    a pressure piece locking means, wherein said pressure piece locking means locks the pressure piece in a second position where the pressure piece does not press the outer edge of the cooking utensil lid.

6. The handle of claim 5 wherein said pressure piece locking means comprises
    a protrusion provided on the pressure piece;
    a pressure button provided on the handle body having a projecting end, said pressure button engaging the protrusion at the second position so as to prevent the pressure piece to retreat to the first position; and
    a pressure button spring constantly pushing the pressure button and the projecting end outwards,
    wherein an entering force substantially greater than the strength of the tension of the pressure button spring pushing the pressure piece shits the pressure piece out of the second position towards the first position.

7. The cooking handle of claim 6 wherein said projecting end of the pressure button is provided with a slant head so as to allow the entering force pushing the pressure piece to easily overcome the strength of the pressure button spring and shift away from the second position towards the pressure creating first position.

* * * * *